(12) United States Patent
Walker

(10) Patent No.: US 8,585,318 B1
(45) Date of Patent: Nov. 19, 2013

(54) SELF-DEPLOYABLE WAVE BREAK SYSTEM

(76) Inventor: Robert Walker, Seabrook, TX (US)

( * ) Notice: Subject to any disclaimer, the term of this patent is extended or adjusted under 35 U.S.C. 154(b) by 18 days.

(21) Appl. No.: 13/437,525

(22) Filed: Apr. 2, 2012

(51) Int. Cl.
*E02B 3/06* (2006.01)
(52) U.S. Cl.
USPC ................... 405/21; 405/15; 405/22; 405/23; 405/25; 405/26; 405/63; 405/107
(58) Field of Classification Search
USPC ........... 405/15, 21–23, 25–27, 30, 31, 33, 35, 405/63, 107, 302.7; 114/266, 267
See application file for complete search history.

(56) References Cited

U.S. PATENT DOCUMENTS

| | | | |
|---|---|---|---|
| 4,048,802 A | 9/1977 | Bowley | |
| 4,691,661 A | 9/1987 | Deiana | |
| 4,712,944 A | 12/1987 | Rose | |
| 4,715,744 A | 12/1987 | Richey | |
| 4,997,310 A | 3/1991 | Rasmussen | |
| 5,174,681 A | 12/1992 | Atkinson et al. | |
| 5,707,172 A | 1/1998 | Wilcox | |
| 6,102,616 A | 8/2000 | Foote | |
| 6,616,383 B2 * | 9/2003 | Janz | 405/302.7 |
| 7,351,008 B2 | 4/2008 | Yodock et al. | |

* cited by examiner

*Primary Examiner* — Tara M. Pinnock
*Assistant Examiner* — Carib Oquendo
(74) *Attorney, Agent, or Firm* — Egbert Law Offices, PLLC

(57) ABSTRACT

A wave break structure having a body with a bulkhead and a first pontoon and a second pontoon. The first pontoon is positioned on one side of the bulkhead and the second pontoon is positioned on the opposite side of the bulkhead. The bulkhead extends substantially above the first and second pontoons. The bulkhead and the pontoons are integrally formed together of a metallic material. The body has a first tow bar and a second tow bar affixed at an end thereof. A plurality of ports extends through a thickness of bulkhead. The bulkhead and the pontoons have angled surfaces so that one body can nest within an adjacent body.

18 Claims, 4 Drawing Sheets

SELF-DEPLOYABLE WAVE BREAK SYSTEM

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to wave breaks. More particularly, the present invention relates to transportable and deployable wave breaks that can be transported to a desired location and then affixed in a position adjacent to a shore.

2. Description of Related Art Including Information Disclosed Under 37 CFR 1.97 and 37 CFR 1.98.

Shore lines, marshland and beaches are subject to erosion and damage from the action of waves impinging thereon. Wave action erodes beaches by several different mechanisms. Waves mobilize shore line materials and then redistribute them, leading to erosion. Rising and falling water levels may erode beaches over a long period of time. Shore line structures, including sea walls, pilings and levees, have increased beach erosion adjacent to those structures, that causing wave reflection, turbulence, eddies and currents. These currents mobilize the beach materials which may be transported along shore or far offshore. Offshore currents, traversing the beach, can carry the beach materials many miles away until the current slows and the beach material sinks due to the influence of gravity. Further, heavy storms can impinge high waves on beaches and shore lines, imparting heavy forces which carry away the beach or crumble the shore line leading to heavy erosion.

In a natural beach/water ecosystem, the shallow water extending up to the beach, and the beach face itself, act to dissipate the energy of the waves, thereby preventing erosion of the land area behind the beach. Typical water front profiles include a surf zone of relatively shallow water where the waves break into surf, a beach zone where a wave expands its last landward energy, and the land area behind the beach. The land areas typically include dunes, low barrier islands, alluvial fans and river deltas, or bluffs. During severe storm conditions, when the waves are commonly two to three times their normal height, the typical beach response is the loss of material from the beach zone to an offshore sand bar. The sand bar then creates a shallow area offshore with a deeper trough between it and the beach face. The shallow area causes the waves to break on the sand bar, thereby initiating dissipation of wave energy further offshore and providing a wider surf zone. Both of these effects decrease beach erosion.

Many methods have been employed in an attempt to reduce shoreline erosion. These attempts have included both protruding and submerged breakwaters located offshore. The protruding breakwater reflects and/or dissipates the waves. A submerged breakwater also reflects and/or dissipates waves, or causes the wave to break further offshore. These breakwaters are typically constructed of concrete or stone, and are solid structures. Commonly, rubble or rocks are piled in a submerged line off the shoreline to form a breakwater.

Breakwaters have several deficiencies. Foremost, they are expensive to build and maintain. Rubble breakwaters erode by losing rock to the action of waves, and unstable subsoils commonly cause the rocks or concrete segments to sink into the sea or lake bed. The use of larger rocks to prevent wave displacement is expensive, because larger rocks cost more to quarry and transport. Often, the method of installation of the rock riprap requires heavy earth-moving equipment to be operated in the same areas which are deemed to be in need of protection. This can be destructive to the shoreline.

Revetments and sea walls are also used to reduce shore line erosion. However, these structures actually inhibit beach and sand bar growth. Therefore, although they may protect the shore behind the beach, they tend to erode the beach by requiring materials for offshore sandbar development to be provided by the adjacent unprotected beach and by creating intensified water currents which may permanently transport the beach materials out to sea.

It is common for the water depths in the areas adjacent to the beach to be too shallow to accommodate equipment on a barge. Reef domes are largely ineffective and must be deployed manually, since they are hollow precast concrete structures. As such, they are too delicate to be handled with heavy equipment. Geotubes require a source of dredge which is not always available and can be very expensive.

In the past, various patents have issued relating to various types of wave break structures. For example, U.S. Pat. No. 4,048,802, issued on Sep. 20, 1977 to W. W. Bowley, shows a floating anchored wave barrier comprising a plurality of members connected by a flexible line. At least one of the members is an inverted vessel having an annulus attached to the periphery of the vessel. The buoyancy and mass of the members are such that when the barrier is placed in water, the top vessel is positioned at or near the water surface and each vessel is partially filled with air. The remaining members can be a vessel having an annulus attached thereto. The remaining members are submerged but near the water surface so that they are located within the top portion of the wave where the major portion of the wave kinetic energy is encountered.

U.S. Pat. No. 4,691,661, issued on Sep. 8, 1987 to S. Deiana, shows a self-adjusting breakwater for artificial harbors. The breakwater elements are flexible and extensible walled bags of which a major part is to be submerged below the surface of the sea. At least one anchor is fixed by a cable to the bottom of the bag. The bag is filled mostly with water and partly by air, whereby at least part of the air-filled portion extends above the surface of the sea.

U.S. Pat. No. 4,712,944, issued on Dec. 15, 1987, to L. J. Rose, describes a seawave dissipator apparatus formed of a plurality of inflatable and floatable buoyant members configured and connected on slack lines. These members are adaptable to yielding to high tide and storm conditions. The members are hollow so as to receive a fluid therein. By positioning the buoyant members in the path of sea waves and by minute adjustments of buoyancy, a maximization of dissipation of the waves occurs.

U.S. Pat. No. 4,715,744, issued on Dec. 29, 1987, to A. Richey, provides a floating breakwater. The floating breakwater is formed from steel plates and is in the nature of a large floating barge. This floating barge is designed to break up the power and force of wave action as the waves come rolling toward the shore.

U.S. Pat. No. 4,997,310, issued on Mar. 5, 1991 to F. C. Rasmussen, shows a portable floating wave dissipating device. This device includes a floating platform, a pivotally connected exposed upper water breaking surface which dissipates the visible portions of oncoming waves, and a pivotally connected submerged lower vane breaking the surface which dissipates the sub-surface portions of oncoming waves. The submerged water breaking surface may also include vanes for redirecting sea water flowing therethrough either upwardly or downwardly to enhance movement of subsurface sediment and sand toward the beach area.

U.S. Pat. No. 5,174,681, issued on Dec. 29, 1992, to Atkinson et al., provides a permeable breakwater for submerged offshore or seawall retentive installation. This breakwater includes a base and permeable opposed sides terminating at an upwardly projecting permeable wave wall. The breakwater is located offshore to cause moderate to heavy waves to break further offshore so as to dissipate their energy before reaching the beach.

U.S. Pat. No. 5,707,172, issued on Jan. 13, 1998, to P. E. Wilcox, shows a floating wave attenuator constructed to float and provide a breakwater. The wave attenuator includes an elongated pipe closed at its ends and attached to large, heavy deflector plates that extend downwardly and connect at their bottom ends to form a V-shaped configuration. The deflector plates are open at their ends to allow water therebetween to act as ballast and assist in retarding up-and-down movement of the wave attenuator in response to wave action.

U.S. Pat. No. 6,102,616, issued on Aug. 15, 2000 to H. G. Foote, describes a wave break that has modular elongated floats that are aligned in end-to-end relationship and extend generally perpendicularly to the anticipated direction of the waves. Modular elongated ballast containers are aligned in end-to-end relationship depending from the floats. The float will be wider than the waves. The ballast in the containers is coordinated with the buoyancy of the floats so that the floats extend higher above the water surface than the waves and the container depends below the water surface by a distance greater than the width of the waves. The lower portion of the ballast container face, which intercepts the waves, is disposed at an angle so as to downwardly deflect the waves.

U.S. Pat. No. 7,351,008, issued on Apr. 1, 2008 to Yodock et al., provides floating barrier units so as to form a floating barrier wall. Each of the units has a housing formed in the shape of a highway barrier having a top wall, a bottom wall, opposed end walls and opposed side walls so as to form a hollow interior. The hollow interior is filled with a foam material. A ballast weight is secured to each barrier unit so as to maintain them in an upright position in the water. Cables, couplers and/or other connectors are employed to mount adjacent barrier units in end-to-end relationship.

It is an object of the present invention to provide a self-deployable wave break which can be towed to a desired location in otherwise difficult to access areas.

It is another object of the present invention to provide a self-deployable wave break system which avoids the use of heavy earth-moving equipment.

It is another object of the present invention to provide a self-deployable wave break system in which each of the units of the system can be stacked upon one another.

It is still a further object of the present invention to provide a self-deployable wave break system which reduces transportation and handling costs.

It is still a further object of the present invention to provide a self-deployable wave break system which can be handled manually.

It is a further object of the present invention to provide a self-deployable wave break system which allows multiple units to be connected in end-to-end relationship and transported to a desired location.

It is a further object of the present invention to provide a self-deployable wave break system which effectively prevents or reduces beach and inshore shoreline erosion, and which protects marshland.

It is still a further object of the present invention to provide a self-deployable wave break system which is easy to use, easy to manufacture and relatively inexpensive.

These and other objects and advantages of the present invention will become apparent from a reading of the attached specification and appended claims.

BRIEF SUMMARY OF THE INVENTION

The present invention is a wave break structure which is comprised of a body having a bulkhead and a first pontoon and a second pontoon. The first pontoon is positioned on one side of the bulkhead. The second pontoon is positioned on the opposite side of the bulkhead. The bulkhead extends upwardly substantially above the first and second pontoons.

The bulkhead and the pontoons are integrally formed together of a metallic material. The bulkhead has a first wall and a second wall formed in an inverted V-shaped configuration. Each of the pontoons has a floor having a side extending upwardly therefrom in spaced relation to the bulkhead. The floor has a first end surface and a second end surface extending upwardly therefrom. The side extends between these first and second end surfaces. The wall of the bulkhead and the side and the first and second end surfaces define an interior of the pontoon. Each of the pontoons is open at the top thereof. The side extends outwardly at an obtuse angle with respect to the floor. The wall of the bulkhead extends at an obtuse angle with respect to the floor. Each of the end surfaces extends outwardly from the floor at an obtuse angle.

The floor of each of the pontoons has at least one hole formed therethrough. A plug is removably affixed wherein the hole. When the plug is removed, water can flow into the pontoon so as to flood the pontoon for the purpose of sinking the body within the water. A stake can be introduced through the unplugged hole. The stake is suitable for affixing the pontoon to an underlying surface.

Each end of the body has a first tow bar and a second tow bar affixed thereto. The second tow bar is positioned below the first tow bar. The bulkhead has a plurality of ports formed through the thickness thereof. These ports are located above each of the pontoons.

The present invention is also a wave break system. This wave break system has a first body with a bulkhead and a first pontoon and a second pontoon, and a second body positioned adjacent to the first body. The second body also has a bulkhead and a first pontoon and a second pontoon. The first pontoon will be positioned on one side of the bulkhead. The second pontoon is positioned on the opposite side of the bulkhead. The bulkhead of the first and second bodies extends upwardly substantially above the respective pontoons.

The bulkhead of the first body has a hollow inverted V-shaped configuration in which a first wall extends at an angle with respect to a second wall. The bulkhead of the second body has a hollow inverted V-shaped configuration in which a first wall extends at an angle with respect to a second wall. The first wall of the bulkhead of the second body overlies the first wall of the bulkhead of the first body. The second wall of the bulkhead of the second body overlies the second wall of the bulkhead of the first body. As such, the second body can be stackable upon the first body. Various other bodies of the wave break system of the present invention can also be stacked upon the second body in a sequential fashion. The pontoons of the second body nest respectively in the pontoons of the first body.

In actual use, the first body will be positioned forwardly of the second body. A cup-shaped member is affixed to the second body. This cup-shaped member is suitable for positioning in the water so as to cause drag during a movement of the second body through the water. The first body has a tow bar affixed at an upper portion of an end of the first body. The second body has a tow bar affixed to a lower portion at an adjacent end of the second body. A tether has one end affixed to a tow bar of the first body and an opposite end affixed to the tow bar of the second body.

Each of the bodies is of a one-piece aluminum structure. The bulkhead of the pontoons has symmetrical attributes which allow the units to be stackable. This reduces transportation and handling costs. The bulkhead is located in the center of each of the bodies and is connected on both sides to the floor of the pontoons. The bulkhead can be built to varying heights to accommodate various shore line conditions. The bulkhead will have a series of ports located above the top of the pontoon so as to allow water to flow therethrough. There is no floor underneath the bulkhead. As such, the bulkhead of one body can be placed upon the bulkhead of an underlying body.

Each of the wave break structures can be transported on a trailer to a boat ramp or a dock near the area where they will be deployed. They can then be unloaded into the water. Each of the bodies is light enough to be handled manually. Multiple units can be connected by removable tethers and towed in a single file fashion in a train by a shallow draft boat. The lead unit can be connected to the boat at a point near the bottom of the body. The tether will be connected to the rear of the lead unit at a point near the top of the lead unit and to the following unit at a point near the bottom of the following unit. This causes the unit to pitch upwardly while under tow and prevents the swamping of the units. The last unit of the train can tow the cup-shaped member so as to provide drag to pull the front of the rear unit upwardly.

Upon arrival at the job site, the bodies can be placed in large groups or separated into smaller groups or placed individually, if necessary. When the unit is in the correct position, the plugs are removed from the holes in the pontoons and each of the bodies will sink Biodegradable stakes can then be placed through these plug holes to anchor the bodies in place until sediment builds in the pontoons of the bodies so as to permanently anchor the wave break structure in place.

When in place, the incoming waves will be tripped by the outer wall of the seaward pontoon so as to result in turbulent water falling into the seaward pontoon and then flowing through the ports in the bulkhead and into the landward pontoon. Ultimately, the incoming waves will then flow over the sides of the landward pontoon as calm water. Sand and silt will settle out of the calm water behind the wave break structure and accumulate so as to rebuild the shore line. Eventually, the sand and silt will bury the wave break structure.

The foregoing "Summary of the Invention" is intended to describe, in generality, the structures of the preferred embodiments of the present invention. It is understood that various modifications can be made from this described structure within the concept of the present invention. This section should not be interpreted, in any way, as limiting of the scope of the present invention. The present invention should only be limited by the following claims and their legal equivalents.

DETAILED DESCRIPTION OF THE INVENTION

Figure 1:
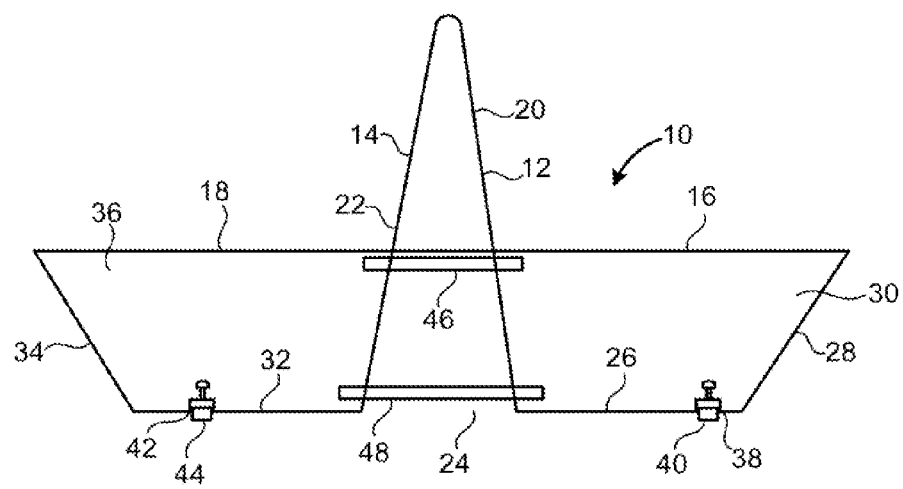
FIG. 1 is an end view of the wave break structure of the preferred embodiment of the present invention.

Referring to FIG. 1, there is shown the wave break structure 10 in accordance with the preferred embodiment of the present invention. The wave break structure 10 includes a body 12 having a bulkhead 14 and a first pontoon 16 and a second pontoon 18. The first pontoon 16 is positioned on one side of the bulkhead 14. The second pontoon 18 is positioned on an opposite side of the bulkhead 14. It can be seen that the bulkhead 14 extends substantially above the first pontoon 16 and the second pontoon 18.

Within the concept of the present invention, the bulkhead 14 and the first pontoon 16 and the second pontoon 18 are integrally formed together of a metallic material, such as aluminum. The bulkhead 14 has a first wall 20 and a second wall 22 formed in an inverted V-shaped configuration. As such, the bulkhead 14 will have an open bottom 24.

The pontoon 16 has a floor 26 extending to the first wall 20 of the bulkhead 14. A side 28 extends upwardly from the end of the floor 26 opposite the wall 20 of bulkhead 14. Side 28 extends upwardly at a generally obtuse angle with respect to the plane of the floor 26. A first end surface 30 also extends upwardly from the floor 26. Another end surface (not shown in FIG. 1) will be located at the opposite end of the side 28. The wall 20, the floor 26, the side 28 and the end surfaces define an interior of the pontoon 16.

Pontoon 18 also has a floor 32, a side 34 and an end surface 36 of a configuration similar to that of pontoon 16. Each of the pontoons 16 and 18 have an opening at a top thereof. As such, each of the pontoons 16 and 18 will be in the nature of a trough.

The floor 26 of the first pontoon 16 has a hole 38 formed therein. A plug 40 is removably affixed within the hole 38 so as to seal the interior of the first pontoon 16. The second pontoon 18 also has a hole 42 formed therein. A plug 44 is removably affixed within the hole 42. It can be seen that the plug 40 and 44 have a suitable handle so that the user can apply an upward force so as to release each of the plugs 40 and 44 from the respective holes 38 and 42.

The body 12 has an upper tow bar 46 and a lower tow bar 48 affixed thereto. The opposite end of the body 12 can also have an upper tow bar and a lower tow bar affixed thereto.

Figure 2:
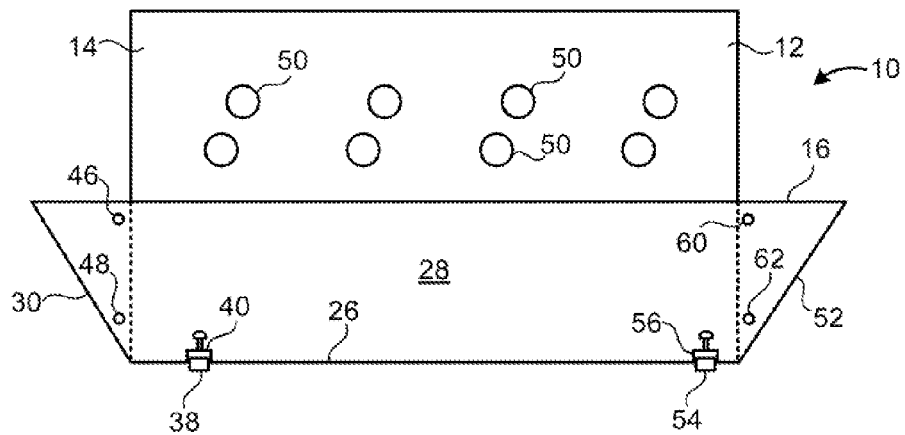
FIG. 2 is a side elevational view of the wave break structure of the preferred embodiment of the present invention.

FIG. 2 is a side view of the wave break structure 10 of the present invention. In FIG. 2, the body 12 has the bulkhead 14 extending substantially above the top of the first pontoon 16. A plurality of ports 50 are formed through the thickness of the bulkhead 14. These ports 50 can allow water to pass therethrough. Each of the walls 20 and 22 of the bulkhead 14 will have ports 50 formed in a corresponding fashion therein.

The first pontoon 16 is illustrated as having the side 28 extending between the end surface 30 and the opposite end surface 52. The end surfaces 30 and 52 extend at an obtuse angle relative to the floor 26. The plug 40 is illustrated as inserted within the hole 38. Another plug 54 is positioned within a hole 56.

The upper tow bar 46 and the lower tow bar 48 are illustrated as positioned generally adjacent to the end surface 30. An upper tow bar 60 and a lower tow bar 62 are illustrated as positioned adjacent to the end surface 52. Each of the tow bars 46, 48, 60 and 62 will extend across the open space defined by the walls 20 and 22 of the bulkhead 14.

Figure 3:
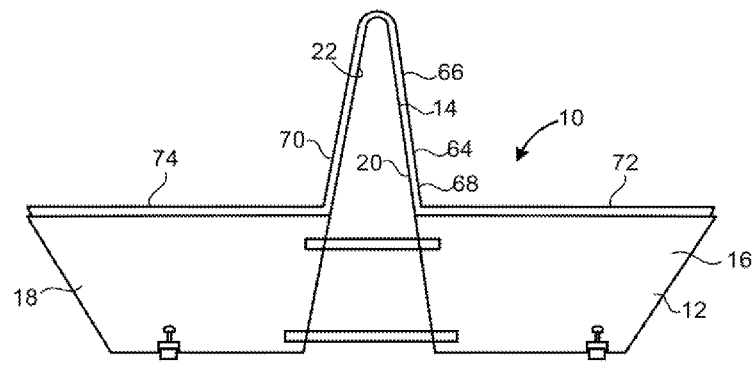
FIG. 3 is a transparent view showing the stackability of the wave break structures in accordance with teachings of the present invention.

FIG. 3 illustrates the stackable relationship between a pair of wave break structures. In FIG. 3, the first body 12 is illustrated as similar to that illustrated in FIG. 1. A second body 64 is illustrated as stacked into and nested within the first body 12. The second body 64 has a bulkhead 66 having a first wall 68 and a second wall 70. The first wall 68 will overlie the first wall 20 at the bulkhead 14. Similarly, the second wall 70 of the second body 64 will overlie the second wall 22 of the bulkhead 14. The first pontoon 72 of the second body 64 is illustrated as nested within the interior of the first pontoon 16 of the first body 12. Similarly, the second pontoon 74 of the second body 64 is nested within the interior of the second pontoon 18 of the first body 12. Each of the wave break structures of the present invention can continue to be stacked upon one another in this manner. As such, the wave break structures can be easily stacked so as to minimize the space required for storage and transport.

Figure 4:
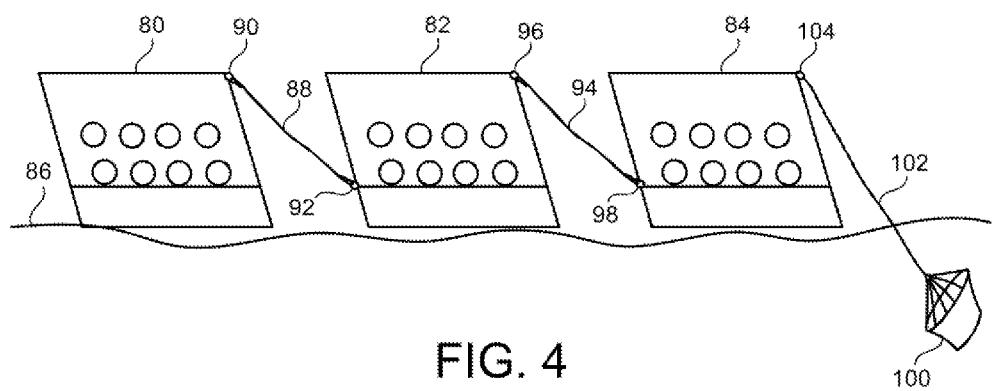
FIG. 4 is a side elevation view showing the wave break system of the present invention located in a stationery position in the water.

FIG. 4 shows an arrangement of three wave break structures 80, 82 and 84. The shape of each of the wave break structures 80, 82 and 84 allows the structures to float on the surface 86 of a body of water. A first tether 88 will extend from an upper tow bar 90 of the first wave break structure 80 to a lower tow bar 92 of the second wave break structure 82. Similarly, another tether 94 will extend between an upper tow bar of the second wave break structure 82 to a lower tow bar 98 of the third wave break structure 84. A cup-shaped member 100 has a line 102 that connects with the upper tow bar 104 of the third wave break structure 84. The cup-shaped member 100 can be in the nature of a parachute. This cup-shaped member 100 will provide drag when placed in the water.

FIG. 4 illustrates the arrangement of the various wave break structures 80, 82 and 84 while in a stationary position in the water. This stationary position can be achieved prior to placement or prior to connection with a transport vessel.

Figure 5:
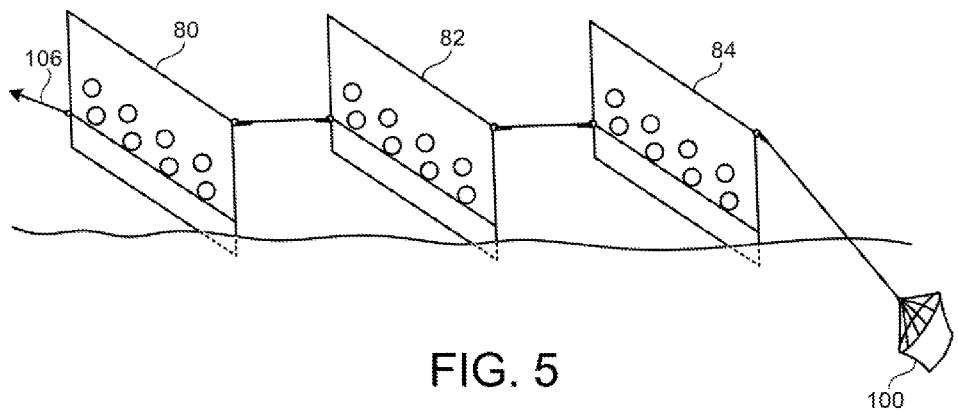
FIG. 5 shows the wave break system of the preferred embodiment of the present invention as being towed by a transport vessel.

FIG. 5 shows the arrangement of the wave break structures 80, 82 and 84 when a pulling force is applied to a line 106 that is connected to a transport vessel. As such, when a force is applied, each of the wave break structures 80, 82 and 84 will pitch upwardly while under tow. This serves to prevent any swamping of the units. The cup-shaped member 100 is positioned at the end of the train of wave break structures 80, 82 and 84 so as to provide drag so as to pull the front of the third wave break structure 84 upwardly. As such, each of the wave break structures 80, 82 and 84 can be transported in a very convenient manner.

Figure 6:
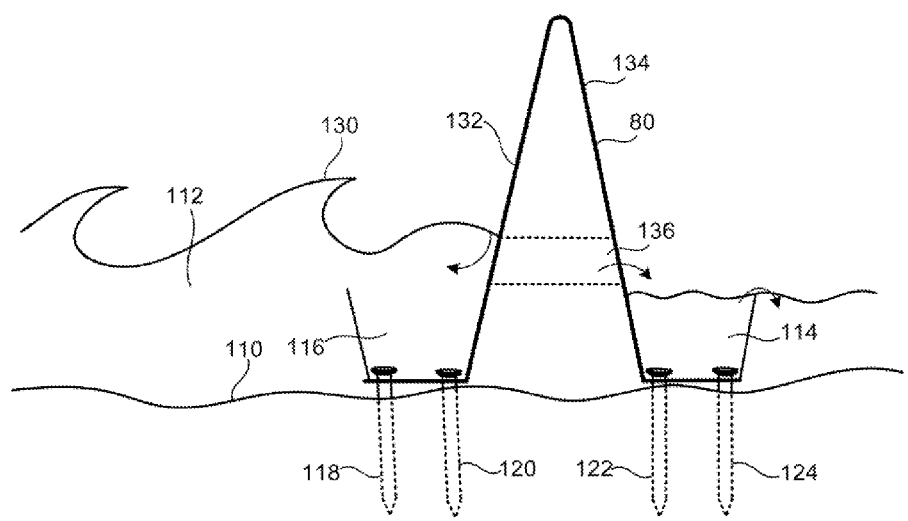
FIG. 6 is a side view showing the making of the wave break structure of the present invention to the floor of a body of water.

When the wave break structures 80, 82 and 84 arrive at their intended destination, the plugs can be removed from the pontoons. FIG. 6 illustrates the manner in which the wave break structure 80 can be placed onto the floor 110 of a body of water 112. When the plugs are removed from the pontoons 114 and 116, water will enter the interior of the pontoons so as to cause the wave break structure 80 to sink Biodegradable stakes 118, 120, 122 and 124 can be placed into the holes in the floor of the pontoons 114 and 116 so as to affix the wave break structure 80 onto the floor 110 of the body of water 12. In FIG. 6, it can be seen that the body of water 12 has waves 130 which are directed towards the wall 132 of the bulkhead 134 of the wave break structure 80. The water will flow through a pathway defined by the ports 136 in the walls 132 and 134. As such, water will flow through the ports 136 and upon the pontoon 114 and outwardly in a non-turbulent manner.

Figure 7:
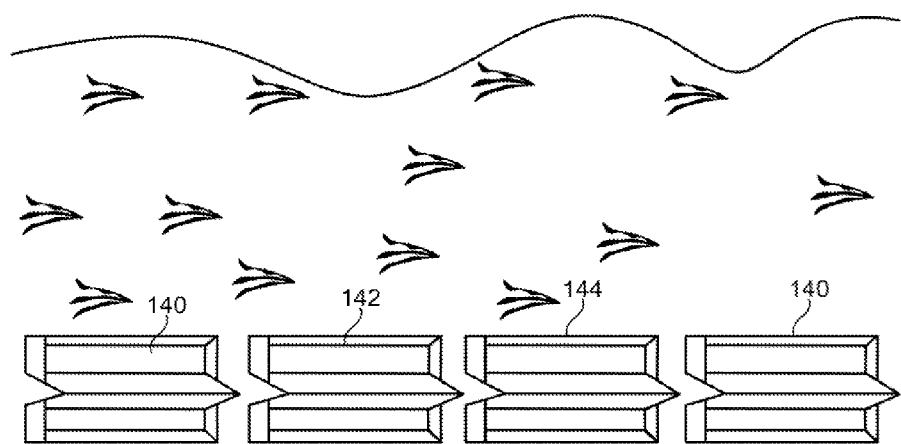
FIG. 7 is a plan view showing the placement of the wave break system of the present invention adjacent to a shore line.

FIG. 7 illustrates an array of the wave break structures 140, 142, 144 and 146 as placed adjacent to a shore line 148. As such, the wave break structures 140, 142, 144 and 146 serve as a barrier to the wave action directed toward the shore line 148.

Figure 8:
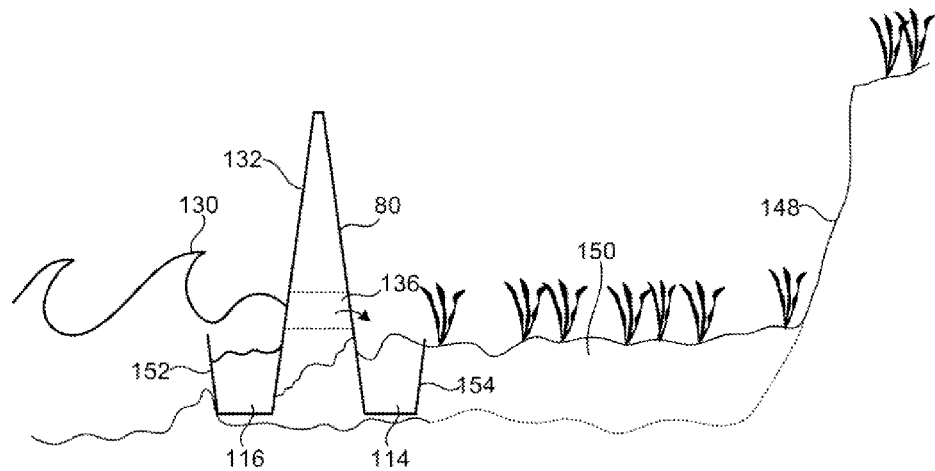
FIG. 8 is a side view showing the placement of the wave break structure of the present invention in a manner so as to enhance the ability to rebuild the shore line.

FIG. 8 shows how the wave break structures of the present invention can be utilized so as to rebuild the shore line. The shore line 148 is now illustrated as having an accumulation of sand and silt 150 between the wave break structure 80 and the shore line 148. The incoming waves 130 will be tripped by the outer wall 152 of the seaward pontoon 116 so as to result in turbulent water falling into the seaward pontoon 116. The water will then flow through the ports 136 of the bulkhead of the wave break structure 80 and into the landward pontoon 114. Ultimately, the water will flow over the side 154 of the landward pontoon 114 as calm water. The sand and silt 150 will settle out of this calm water behind the wave break structure 80 and accumulate so as to rebuild the shore line. Ultimately, the wave break structure 80 will be buried by the sand and silt.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A wave break structure comprising:
   a body having a bulkhead and a first pontoon and a second pontoon, said first pontoon positioned on one side of said bulkhead, said second pontoon positioned on an opposite side of said bulkhead, said bulkhead extending upwardly substantially above said first and second pontoons, each of said first and second pontoons having a floor with a side extending upwardly therefrom in spaced relation to said bulkhead, said floor having a first end surface and a second end surface extending upwardly therefrom, said side extending between said first and second end surfaces, a wall of said bulkhead and said side and said first and second end surfaces defining an open interior of each of said first and second pontoons.

2. The wave break structure of claim 1, said bulkhead and said first and second pontoons being integrally formed of a metallic material.

3. The wave break structure of claim 1, said bulkhead having a first wall and a second wall formed in an inverted V-shaped configuration.

4. The wave break structure of claim 1, each of said first and second pontoons being open at a top thereof.

5. The wave break structure of claim 1, said side extending outwardly at an obtuse angle with respect to said floor, said wall of said bulkhead extending at an obtuse angle with respect to said floor.

6. The wave break structure of claim 1, each of said first and second end surfaces extending outwardly at an obtuse angle from said floor.

7. The wave break structure of claim 1, said floor of each of said first and second pontoons having at least one hole formed therethrough, the wave break structure further comprising:
a plug removably affixed within said at least one hole.

8. The wave break structure of claim 5, further comprising:
a stake received in said at least one hole, said stake suitable for affixing the pontoon to an underlying surface.

9. The wave break structure of claim 1, further comprising:
a first tow bar affixed to one end of said body; and
a second tow bar affixed to said body at a position below said first tow bar.

10. The wave break structure of claim 1, said bulkhead having a thickness dimension, said bulkhead having a plurality of ports formed through said thickness dimension.

11. A wave break system comprising:
a first body having a bulkhead and a first pontoon and a second pontoon, said first pontoon positioned on one side of said bulkhead, said second pontoon positioned on an opposite side of said bulkhead, said bulkhead extending upwardly substantially above said first and second pontoons; and
a second body positioned adjacent to said first body, said second body having a bulkhead at a first pontoon and a second pontoon, said first pontoon of said second body positioned on one side of said bulkhead of said second body, said second pontoon of said second body positioned on an opposite side of said bulkhead of said second body, said bulkhead of said second body extending substantially above said first and second pontoons of said second body, said bulkhead of said first body having a hollow inverted V-shaped configuration in which a first wall extends at an angle with respect to a second wall, said bulkhead of said second body having a hollow inverted V-shaped configuration in which a first wall extends at an angle with respect to a second wall, said first wall of said bulkhead of said second body overlying said first wall of said bulkhead of said first body, said second wall of said bulkhead of said second body overlying said second wall of said bulkhead of said first body.

12. The wave break system of claim 11, said first and second pontoons of said second body nesting respectively in said first and second pontoons of said first body.

13. The wave break system of claim 11, said first body positioned forwardly of said second body.

14. The wave break system of claim 11, further comprising:
a cup-shaped member affixed to said second body, said cup-shaped member suitable for positioning in water so as to cause drag during a movement of said second body and through water.

15. The wave break system of claim 11, said first body having a tow bar affixed at an upper area at one end thereof, said second body having a tow bar affixed to a lower area at one end of said second body, the wave break system further comprising:
a tether having one end affixed to said tow bar of said first body and an opposite end affixed to said tow bar of said second body.

16. The wave break system of claim 11, each of said first and second bodies being integrally formed of a metallic material.

17. The wave break system of claim of claim 11, each of said first and second pontoons of each of said first and second bodies having a floor with one side extending upwardly therefrom in spaced relationship to the bulkhead thereof, said floor having a first end surface and a second end surface extending upwardly therefrom, said one side extending between said first and second end surfaces, a wall of the bulkhead and said one side and said first and second end surfaces defining an interior of the pontoon.

18. The wave break system of claim 11, the bulkhead of said first and second bodies having a plurality of ports formed through a thickness thereof.

* * * * *